United States Patent [19]

Brandenstein et al.

[11] Patent Number: 4,589,860
[45] Date of Patent: May 20, 1986

[54] GEAR AND METHOD FOR MAKING THE SAME

[75] Inventors: Manfred Brandenstein, Eussenheim; Roland Haas, Hofheim; Gerhard Herrmann, Schweinfurt; Herbert Dobhan, Bergrheinfeld; Rüdiger Hans, Niederwerrn, all of Fed. Rep. of Germany

[73] Assignee: SKF Kugellagerfabriken GmbH, Fed. Rep. of Germany

[21] Appl. No.: 615,779

[22] Filed: May 31, 1984

[30] Foreign Application Priority Data

Jun. 25, 1983 [DE] Fed. Rep. of Germany ....... 3322907

[51] Int. Cl.⁴ .............. F16H 55/06; F16H 55/30; F16H 55/17; F16H 55/12
[52] U.S. Cl. .................................. 474/161; 474/152; 74/460; 74/446; 74/434; 74/DIG. 10
[58] Field of Search .................. 474/161, 165, 152; 74/460, 461, 446, 443, 449, 434, 439, DIG. 10

[56] References Cited

U.S. PATENT DOCUMENTS

| | | | |
|---|---|---|---|
| 2,720,119 | 10/1955 | Sherman | 74/460 |
| 2,955,481 | 10/1960 | Jackel | 74/443 |
| 3,076,352 | 2/1963 | Larsh | 74/460 |
| 3,180,171 | 4/1965 | Arpin | 74/460 |
| 3,272,027 | 9/1966 | Wayman | 474/161 |
| 3,469,465 | 9/1969 | Bebbington, Jr. et al. | 74/439 |
| 3,469,466 | 9/1969 | Heathwaite et al. | 74/439 |
| 3,469,467 | 9/1969 | Seaman | 74/439 |
| 3,469,468 | 9/1969 | Cozzarin et al. | 74/439 |
| 3,730,009 | 5/1973 | Mead et al. | 474/161 |
| 3,839,921 | 10/1974 | Haug | 474/161 |
| 3,990,136 | 11/1976 | Hishida | 474/161 |
| 4,453,924 | 6/1984 | Sugino | 474/161 |

FOREIGN PATENT DOCUMENTS

| | | | |
|---|---|---|---|
| 123043 | 9/1980 | Japan | 74/DIG. 10 |
| 135265 | 10/1980 | Japan | 74/460 |
| 7708864 | 8/1977 | Netherlands | 74/DIG. 10 |

Primary Examiner—Lawrence J. Staab
Assistant Examiner—Michael D. Bednarek
Attorney, Agent, or Firm—Eugene E. Renz, Jr.

[57] ABSTRACT

Gear for chain drives comprising a gear body of cast material having a hub section, a gear rim section with spur teeth, and a web section joining said hub and gear rim sections, and a ring plate of metal embedded in the web section, the outer edge of said plate being near the bottom of the areas between the spur teeth and having axial openings filled with casting material around its periphery, said ring plate having at its outer radial edge, radially outwardly directed projections, which are located in each case in a tooth, and which are embedded in the casting material of the gear body, said projections extending beyond the bottom of the spaces between adjacent spur teeth, and an axial opening formed in the ring plate adjacent each projection and radially below it.

6 Claims, 6 Drawing Figures

GEAR AND METHOD FOR MAKING THE SAME

BACKGROUND OF THE INVENTION

The present invention relates to improvements in gears especially designed for chain drives and to a method for making the same.

Gears of the type to which the present invention relate are not new per se. U.S. Pat. No. 3,076,352 shows a gear having a ring plate embedded in the gear body wherein the ring plate is provided at its outer radial edge with a collar which supports the toothed rim section. It has been found that the compressive and bending strengths of the teeth of the gear depend essentially on the strength of the casting material used which may be plastic. Since the teeth of many gears, particularly gears for chain drives are relatively long, they are subjected to relatively large bending stresses and therefore the gear body of presently known gears must be cast from an extremely strong and relatively expensive plastic material. These high-strength plastic casting materials are usually very hard and relatively complicated to process since there is always the danger of fractures due to the brittleness of the material. Furthermore, a toothed rim section produced from hard casting material produces undesirable noise during operation of the gear.

To this end, the present invention provides a gear particularly adapted for chain drives comprising a gear body cast of a relatively soft, shock-absorbing plastic material, the gear body having a hub section, a gear rim section with spur teeth and a web section joining the hub section and gear rim section. An annular ring plate made of metal is embedded in the web section. The outer peripheral edge of the stiffening ring plate is located adjacent the land areas between the spur teeth and has a series of circumferentially spaced axially directed openings filled with the casting material about its periphery to lock the two in place after the casting operation. The ring plate is provided at its outer radial edge with a series of circumferentially spaced radially outwardly projecting fingers which are disposed in each case in radial alignment with the spur teeth and which are embedded in the casting material of the gear body. The finger-like projections extend beyond the bottom of the land areas between the spur teeth and located in radial alignment therewith is an axially directed opening machined in the ring plate. This construction provides a gear body capable of absorbing shock notwithstanding high compressive and bending stresses of the spur teeth.

Further, the individual teeth of the toothed rim section are stiffened both in the peripheral and axial direction by the finger-like projections. The toothed flanks which are stiffened by the projections have high compressive strength even if the gear body is made of a resilient shock-absorbing plastic. Thus, in spite of the resilience of the casting material, each tooth of the toothed rim section has high bending strength which means that the gear can withstand severe operating conditions which subject the teeth to high loads.

In accordance with another feature of the present invention, the area between adjacent finger-like projections and the outer edge of the ring plate matches the contour of the land spaces or flanks between the spur teeth. This provides particularly high stiffness and strength at the bottom of the land areas which is advantageous particularly in gears of chain drives which are subjected to considerable stress at these locations. The finger-like projections of the metal ring plate preferably extend for at least half the radial height of the spur teeth to ensure that the tooth flanks near the root where they are subjected to the greatest loads are supported by the outer edge of the ring plate and are, therefore, relatively stiff and unyielding. Moreover, in the area of the tip of the teeth, the tooth flanks are designed to be increasingly elastically resilient as a function of the compressibility and/or bending elasticity of the casting material used. In this fashion, the outer tips of the teeth guide the individual chain links radially inward to the bottom of the land areas and minimize start-up jolts while simultaneously aligning the links.

In accordance with still another feature of the present invention, the ring plate has at its inner peripheral edge at least one axially extending collar confronting and engaging the outer periphery of the outer ring of the bearing to provide a firm support for the gear with the result that the toothed rim is supported rigidly and concentrically in the radial direction on the bearing. Therefore, the teeth of the rim gear body engage with a chain or with an associated counter gear at the prescribed pitch circle notwithstanding the fact that the casting material of the gear body has a degree of elastic resilience. The ring plates with the collar section may be produced rather economically by a stamping or pressing operation from a semi-finished flat sheet of metal strip material.

In accordance with a modified embodiment of the present invention, the metallic ring plate may be provided with an axial slot extending radially inwardly from the axial openings disposed below the finger-like projections and in this manner the webbed section of the gear body has a degree of flexibility in a circumferential direction. The webbed section and hub section can also be made somewhat flexible.

In accordance with still another feature of the present invention, the ring plate is provided at its inner edge with a circumferential radial recess which expands towards the axial end of the collar sections and which is filled with an elastic or plastically resilient casting material of the gear body. This ensures that the surface pressure between the bearing assembly and the sides of the collar section embracing the bearing are approximately equal in the axial direction even though the ring plate has greater radial stiffness at its radial inner edge near the webbed section. This prevents bulging of the ring plate when it is seated on the bearing element which may be harmful.

This invention also provides a novel method for making gears having the features described above. To this end the gear body and ring plate with axial openings formed therein are formed by introducing the casting material uniformly into a mold from the periphery on one side of the ring plate whereby the material flows over the outer edge of the ring plate and also through all of the axial openings to the other side of the ring plate. In this manner, the finger-like projections are anchored very solidly in the casting material against coming loose. Further, by this process, casting streams develop which are decelerated at the edge of the ring plate and in the holes. On the opposite side of the ring plate, the casting streams meet each other so that seams occur in the plastic at these locations. These seams have a pattern which is rotationally symmetrical to the axis of the gear. By reason of forming the gear in this fashion, the spur teeth have high bending strength since the contact surfaces of the teeth have no seams which may weaken the casting material. It has been found that seams of an injection molded plastic are especially harmful if it is a fiber reinforced plastic since the strength of the material is reduced at the location of these seams by reason of unfavorable fiber orientation. The present invention overcomes these difficulties when utilizing fiber reinforced plastic inasmuch as the seams are not formed or produced at the highly stressed portions of the gear due to the manner in which the casting streams develop during molding as described above.

BRIEF DESCRIPTION OF THE DRAWINGS

These and other objects of the present invention and the various details of the construction of a gear in accordance with the present invention and the method for making the same are hereinafter more fully set forth with reference to the accompanying drawings, wherein.

DESCRIPTION OF THE PREFERRED EMBODIMENTS

Figure 1:
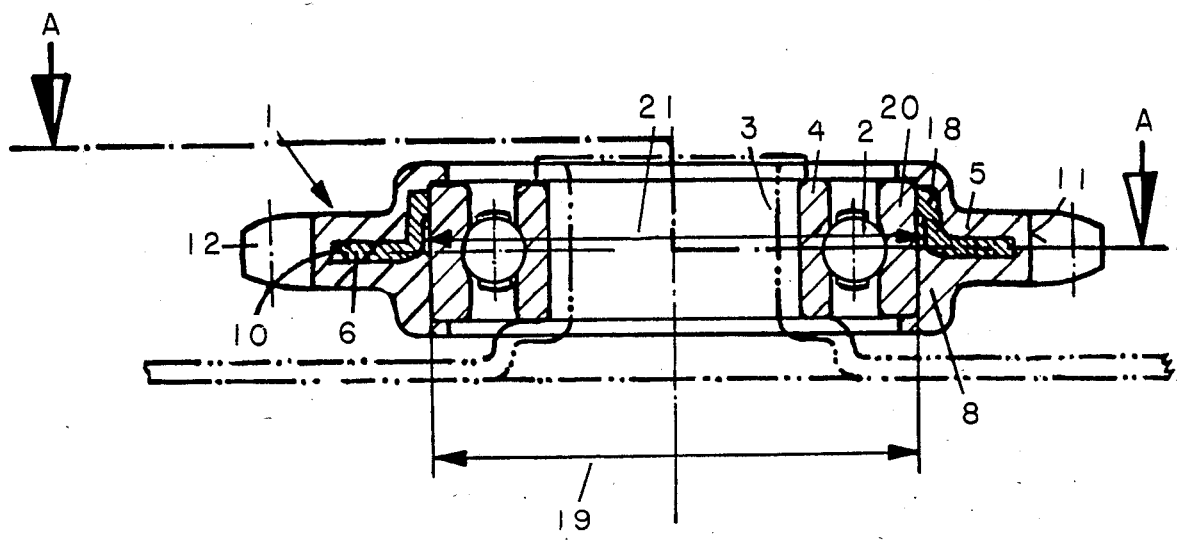
FIG. 1 is a longitudinal sectional view through a gear constructed in accordance with the present invention.
Figure 2:
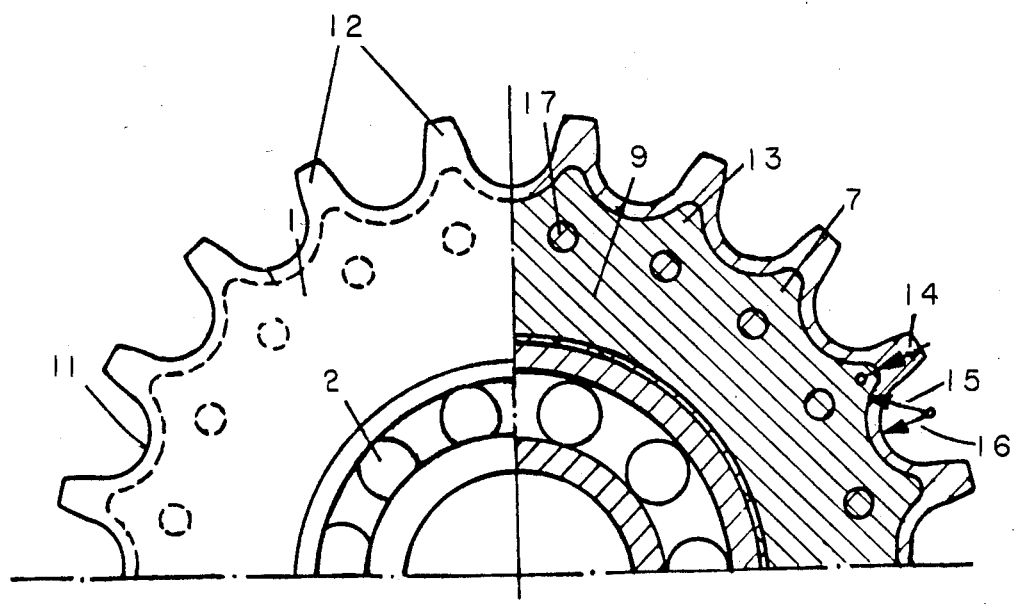
FIG. 2 is a fragmentary sectional view taken along lines A—A of FIG. 1.

Referring now to the drawings, and particularly to FIGS. 1 and 2 thereof, there is illustrated a gear of a chain drive (chain tension adjusting roller) generally designated by the numeral 1. The gear is supported for rotation on a grooved ball bearing assembly 2 having an inner ring 4 which is seated in a cylindrical shoulder 3 forming part of a housing 3a (shown in broken lines).

The gear 1 comprises an annular gear body portion 5 which in the present instance is made of a shock-absorbing, elastically resilient plastic material such as glass fiber filled polyamid and an annular stiffening ring plate 6 of sheet metal embedded in the gear body 5. The outer periphery of the gear body 5 has a toothed rim section 7 formed with a plurality of circumferentially spaced spur gear teeth 12, a hub section 8, and a radially extending web section 9 formed integrally with and joining the toothed rim and hub sections. The gear body is of inverted T-shaped cross section so that the peripheral edge of the radial leg of the T-section is the toothed section 7 and the cross piece defines the hub section 8. As illustrated, the hub section 8 is formed with radially inwardly directed flanges 8a at opposite axial ends which embrace the outer ring 20 of the bearing assembly.

As illustrated the ring plate 6 is encased or embedded in the web section 9 and has a scalloped outer peripheral edge located closely adjacent the land areas 13a of the gear teeth and defining a plurality of finger-like projections 13 which extend radially outwardly beyond the bottom 11 of the spaces between the teeth 12. As illustrated, each finger-like projection 13 is aligned with a tooth of the spur gear and preferably extends about half the radial height of the teeth 12. In the present instance, the projections have a convex contour which curves outward in the radial direction with a radius of curvature 14.

In the area between adjacent projections 13 of the ring plate, the outer edge 10 has an inwardly curved, concave contour with a radius of curvature 15. The outer edge 10 of the ring plate is at this point curved concavely in the form of a circular segment so that this edge lies closely adjacent and complements or closely follows the arcuate contour of the bottom 11 of the land areas between the teeth which as illustrated has a somewhat smaller radius of curvature 16.

In the present instance, the ring plate 6 is formed with a collar section 18 at its inner peripheral edge. The collar which is formed integrally with the plate is formed as an annular axially directed shoulder and located in the hub section 8 of the gear body. In the embodiment illustrated, the collar projects axially beyond the ring plates 6 and defines a cylindrical bore 19 on which the outer ring of the bearing assembly is directly supported. As illustrated, the collar section has a short radially inwardly directed flange so that it is of generally Z-shaped cross section which provides a clearance 21 between the outer periphery of the outer ring of the bearing assembly and which recess is filled with the casting material and in this fashion, the bore surface 19 of the collar section 18 provides a smooth transition to the adjoining bore surface of the hub 8 of the gear body 5.

A series of circumferentially spaced openings are formed in the ring plate which are arranged on a common pitch circle diameter and which in this instance are radially aligned with and disposed slightly below the finger-like projections 13. These openings provide an anchor means between the ring plate 6 and gear body 5 and also facilitate the novel casting of the assembly without formation of seams or the like in the gear teeth as explained in more detail below.

Figure 5:
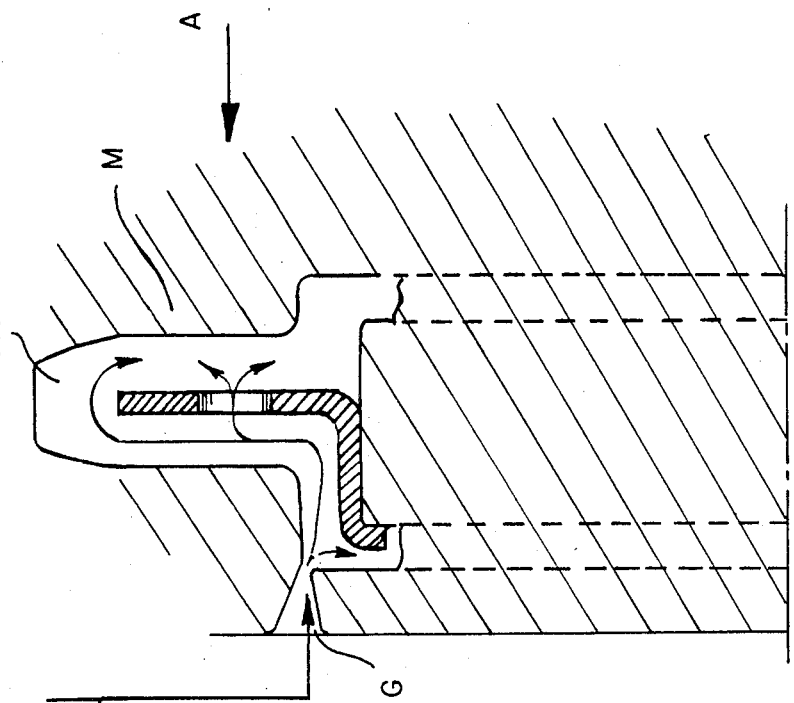
FIG. 5 is a schematic of a mold for forming a gear in accordance with the present invention.
Figure 6:
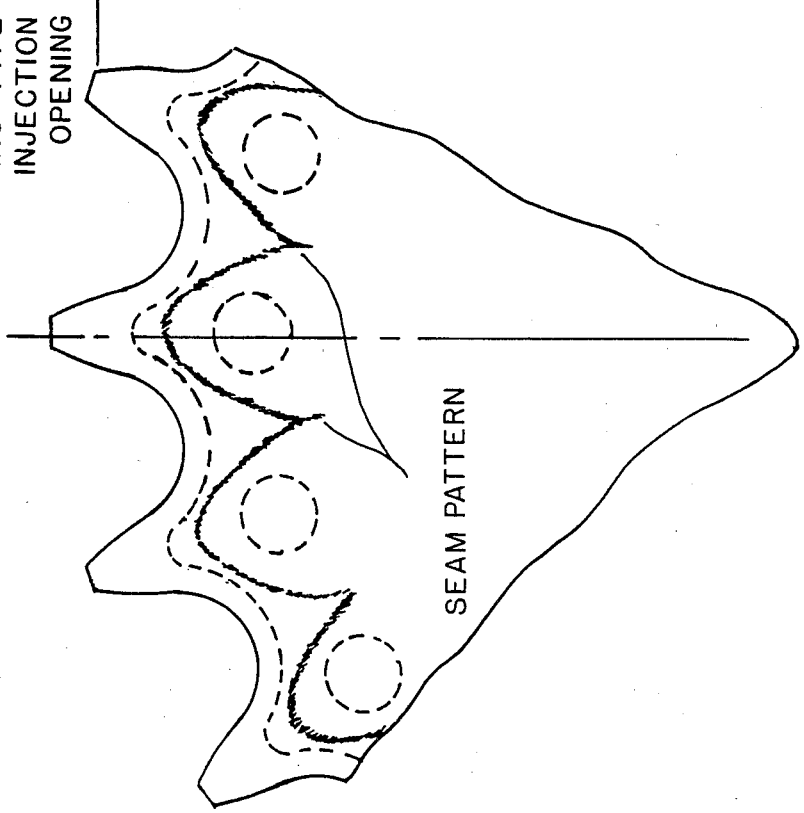
FIG. 6 is a fragmentary view of the gear showing the seam pattern.

Considering now the method for making a gear of the type described above, the ring plate 6 is positioned in a mold M having a contour to the shape of the gear body 5 and temporarily supported in a predetermined position in the mold by holding pins engaging through the axial openings in the ring plate. The plastic material is then fed from one side of the ring plate through a concentric ring-shaped feed gate G into the mold cavity C in a conventional manner. The molten plastic material flows over the outer edge 10 of the ring plate 6 and through all of the axial openings 17 to the opposite side of the ring plate 6 (see FIG. 5). The colliding casting streams form a pattern of seams on the other side of the ring plate which is rotationally symmetrical to the axis of the gear 1 (see FIG. 6). The size of the opening 17 and the size of the radial gap between the outer edge 10 of the ring plate 6 and the confronting wall of the mold are coordinated to each other in the present instance in such a manner that the casting streams move simultaneously over the outer edge 10 of the periphery of the ring plate 6 and through the axial opening 17.

Figure 3:
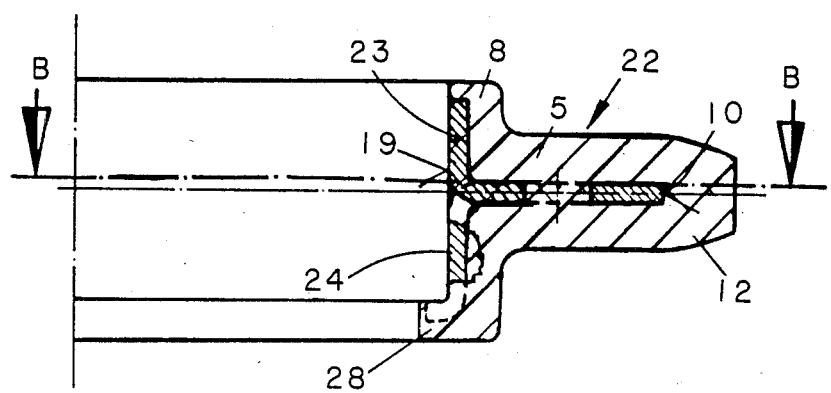
FIG. 3 is an enlarged partial fragmentary longitudinal cross-sectional view through a modified gear in accordance with the present invention.
Figure 4:
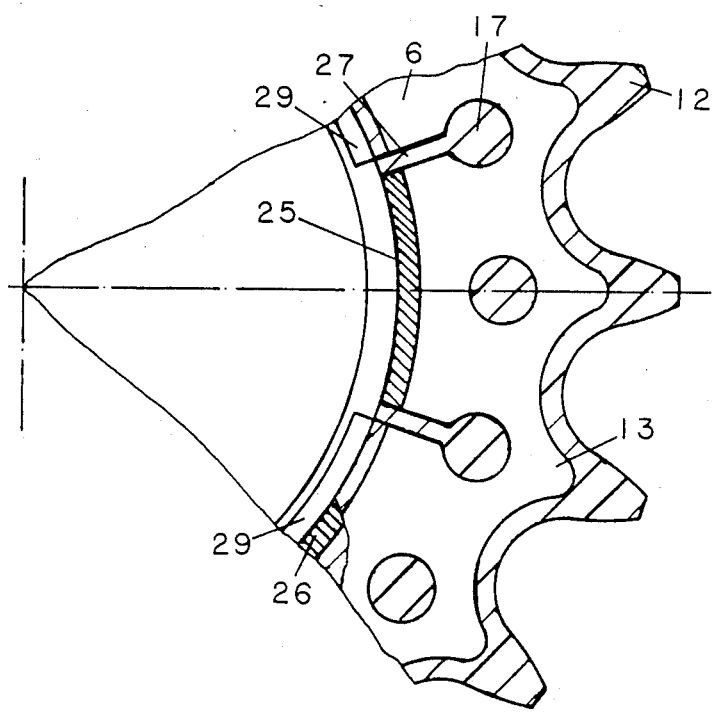
FIG. 4 is a sectional view taken on line B—B of FIG. 3.

FIGS. 3 and 4 illustrate a modified form of a gear for a chain drive in accordance with the present invention. The basic configuration is generally the same as that above and thus, it consists of a gear body 5b made of a plastic casting material and a ring plate 6b of metal strip material embedded in the gear body 5b. The ring plate 6b has as in the previously described embodiment a plurality of circumferentially spaced finger-like projections at its outer peripheral edge 10b which extend radially outwardly and align with a tooth 12b of the spur gearig of the toothed rim 7b and are completely embedded in the casting material. Axial openings 17b are formed in the ring plate 6b near and radially inwardly of each projection 13b.

In the present instance, the ring plate 6b is formed with a pair of axially directed collar sections 23,24 which are embedded in the hub section 8b of the gear body 5b. The collar section 23 is formed at the inner edge of the ring plate 6b by a series of circumferentially spaced tabs 25 which are bent over in an axial direction whereas the other collar 24 is formed at the inner edge of the ring plate 6b by a series of circumferentially spaced tabs bent in the opposite direction. The individual tabs 25,26 are bent over in alternate directions around the periphery of the inner edge of the ring plate 6b. The cylindrical bore of the hub section 8b and the gear body 5b and the inner radial boundary surfaces 19 of the tabs 25, 26 form an elongated common support surface for the outer ring of a bearing assembly (not shown). In this manner, the gear 22 is supported directly on the bearing element by the tabs 25, 26. In the present instance, the body section includes a ring-shaped shoulder at one axial end of the hub section which is stiffened by means of a radially inwardly directed short terminal flange 29 of the tab 26 the confronts and embraces the axial end face of the outer ring of the bearing assembly.

In accordance with this embodiment, radial slots 27 are machined in the ring plate 6b which extend from evey other opening 17b around the periphery of the ring plate and inwardly to the inner edge thereof. As illustrated, the individual tabs 25, 26 are bounded by these slots 27 at the inner edge of the ring plate 26.

The gear 22 shown in FIGS. 3 and 4 and described above can be cast in a mold in the same manner as described previously in connection with the gear 1. The casting material is in this case introduced into the mold on one of the two sides of the ring plate 6b so that casting streams develop which move over the outer edge of the ring plate 6b and through all of the axial openings to the opposite side of the ring plate 6b.

While particular embodiments of the present invention have been illustrated and described herein, it is not intended to limit the invention and changes and modifications may be made therein within the scope of the following claims. For example, a common radial recess can be provided in the collar sections 23 and 24 in the area of the juncture between the ring plate and the collar sections and which radial recess expands toward the axial ends of the two collar sections. Further, in this way the inner boundary surface or bore 19 of the collar sections directly contacts the outer ring of the bearing assembly only at a certain axial distance from the ring plate located in the webbed section of the gear body. Further, a retaining shoulder for the bearing element could also be cast at the opposite axial end of the hub section 8b of the embodiment shown in FIG. 3. The bearing assembly can then be moved axially into the hub section and snapped into place in view of the fact that the casting material and the tabs 25, 26 have a degree of bending elasticity.

SUMMARY

A gear 1 consists of a gear body 5 of casting material with spur gear teeth and a metal ring plate 6, which is embedded in the gear body 5, which comes close to the bottom of the spaces between the spur teeth 12, and which has axial holes 17 around its periphery.

So that the gear body 5 can be manufactured from a relatively soft, shock-absorbing casting material (plastic), the outer edge 10 of the ring plate 6 is provided with projections 13, which project radially outward beyond the bottom 11 of the spaces between adjacent spur teeth 12. Each projection 13 of the ring plate 6 is embedded in the casting material of an individual tooth 12 of the spur gear teeth. Near and radially below each individual projection 13, and axial hole 17 is drilled through the ring plate 6.

What is claimed is:

1. Gear for chain drives comprising a gear body made of a cast plastic material having a hub section, a gear rim section consisting of a plurality of circumferentially spaced spur gear teeth and a web section joining the hub and gear rim sections, a ring plate having a radial annular section completely embedded in the gear body and collar sections at the inner periphery of the radial annular section defining mounting means for the gear, the radial annular section of said ring plate 6 having at its outer radial edge 10, radially outwardly directed projections 13, which are located in each case in a tooth 12, and which are embedded in the casting material of the gear body 5, said projections extending beyond the bottom of the spaces 11 between adjacent spur teeth 12, and an axial opening 17 formed in the ring plate 6 adjacent each projection 13 and radially below it, said ring plate 6 having one or more axial slots 27 extending radially inwardly, starting in each case from one of the axial openings 17.

2. Gear according to claim 1, wherein the gear body 5 is made of an elastic casting material and that each projection 13 of the ring plate 6 extends about half-way up the radial height of the spur teeth 12.

3. Gear according to claim 1, wherein the ring plate 6 has at its inner edge at least one axial collar section 18 in the hub section 8 of the gear body 5 with bore surfaces 19, which directly support the gear 1, 22 on a bearing element 20.

4. Gear according to claim 3, wherein the collar section is formed by a ring-shaped flange 18 bent over in the axial direction.

5. Gear according to claim 3, wherein two collar sections 23, 24 are formed by tabs 25, 26 bent over alternately into the one or the other axial direction around the circumference of the inner edge of the ring plate 6.

6. Gear according to claim 3, wherein the ring plate 6 has at its inner edge a circumferential, radial recess 21, which expands toward the axial end of one or both collar sections 18, 23, 24, and which is filled with an elastic or plastically resilient casting material of the wheel body 5.

* * * * *